United States Patent [19]
Blankenship et al.

[11] Patent Number: 6,076,215
[45] Date of Patent: Jun. 20, 2000

[54] APPARATUS AND METHOD FOR ATTACHING A LOADING RAMP TO A PICKUP TRUCK

[76] Inventors: Lowell E. Blankenship, 15771 Ham Rd., Athens, Ala. 35611; Willie L. Dawson, Jr., 105 Hylis Cir., Madison, Ala. 35758

[21] Appl. No.: 09/059,083

[22] Filed: Apr. 13, 1998

[51] Int. Cl.[7] ................................................. E10D 1/00
[52] U.S. Cl. ........................................ 14/71.1; 14/69.5
[58] Field of Search ............................ 414/537; 14/69.5, 14/71.1, 71.3, 7.8; 296/61

[56] References Cited

U.S. PATENT DOCUMENTS

| | | | |
|---|---|---|---|
| 3,580,404 | 5/1971 | Moser | 14/71.1 |
| 3,675,800 | 7/1972 | Weyant et al. | 296/61 |
| 3,763,827 | 10/1973 | Burkart | 119/82 |
| 3,834,565 | 9/1974 | Goodman, Jr. et al. | 296/61 |
| 4,795,304 | 1/1989 | Dudley | 414/537 |
| 4,934,894 | 6/1990 | White | 414/462 |
| 5,062,174 | 11/1991 | DaSalvo | 14/69.5 |
| 5,133,634 | 7/1992 | Gingrich et al. | 414/537 |
| 5,145,308 | 9/1992 | Vaughn et al. | 414/462 |
| 5,253,410 | 10/1993 | Mortenson | 29/436 |
| 5,273,335 | 12/1993 | Belnap et al. | 296/61 |
| 5,287,579 | 2/1994 | Estevez, Jr. | 14/71.1 |
| 5,540,474 | 7/1996 | Holland | 296/61 |
| 5,649,732 | 7/1997 | Jordan et al. | 296/26 |
| 5,697,754 | 12/1997 | Raymer | 414/537 |
| 5,813,714 | 9/1998 | Lipinski et al. | 296/61 |
| 5,816,767 | 10/1998 | Mann | 414/537 |
| 5,899,655 | 5/1999 | Miller et al. | 414/462 |
| 5,907,276 | 5/1999 | Lance | 340/425.5 |

*Primary Examiner*—Eileen Dunn Lillis
*Assistant Examiner*—Gary S. Hartmann
*Attorney, Agent, or Firm*—Curtis W. Dodd

[57] ABSTRACT

A loading apparatus and method for attaching and mounting a loading ramp to a hitch receiver of a pickup truck, van or similar vehicle. A attachment apparatus is comprised of a receiver bar, a support structure, a ramp and a clamping plate for clamping the support structure to the opened tailgate of the pickup truck. The apparatus provides an attachment and also provides for load sharing between the receiver and the tailgate.

14 Claims, 4 Drawing Sheets

APPARATUS AND METHOD FOR ATTACHING A LOADING RAMP TO A PICKUP TRUCK

BACKGROUND OF THE INVENTION

The present invention relates to mounting or attaching a loading ramp to a pickup truck or similar vehicle. One common method of providing a loading ramp to a pickup truck comprises placing one end of a wooden ramp, such as a two by ten, on the ground and the other end on the top of an opened tailgate of the pickup truck. In some cases the wooden ramps are attached to the tailgate or the ground to keep the wooden ramp from slipping. There have been improvements over the wooden ramp method such as metal ramps with attachment means such as straps and brackets.

There have been numerous improvements to the above mentioned home use ramps. One such improved ramp is marketed by EZN Ramps of Santa Barbara, Calif. This ramp is secured to the tailgate with screws or bolts and fits inside the bed of the truck when the tailgate is closed. Other ramps observed at truck shows and equipment dealers have a variety of means for attaching loading ramps to pickup trucks.

Several U.S. patents describe loading ramps for pickup trucks, but do not have the structure of the present invention. In addition there are a number of loading ramps available in the marketplace not described in patents, but are relevant prior art.

U.S. Pat. No. 4,735,454 issued to John N. Bernard on Apr. 5, 1988 shows a bifold loading ramp that is interchangeable with the tailgate of a pickup truck. The structure of the truck is not damaged because the existing hardware of the pickup truck is used to mount the loading ramp. Neither the existing tailgate or a receiver are elements of the Bernard invention.

U.S. Pat. No. 4,795,304, issued to James D. Dudley on Jan. 3, 1989 describes a folding ramp attached to the rear bumper of a pickup truck. When the folding ramp is extended, two support posts are provide to help support the ramp and the tailgate serves as part of the ramp system.

U.S. Pat. No. 5,273,335, issued to Philip Belnap on Dec. 28, 1993 describes a loading ramp having both telescopically engaged ramp sections and hinged sections. The loading ramp of Belnap when collapsed would replace the typical tailgate of a pickup truck.

U.S. Pat. No. 5,312,149, issued to Frank J. Boone on May 17, 1994 describes a loading ramp for a pickup truck consisting of at least three telescopically engaged ramp sections. Boone incorporates the ramp within a tailgate thereby providing a fully retractable ramp structure. Such a ramp could be incorporated in the manufacture of new pickup tailgates.

U.S. Pat. No. 5,649,732, issued to Gary Wayne Jordan on Jul. 22, 1997 shows a ramp system for a pickup truck where a ladder-like ramp is connected to a round tube using slidable rings attached to one end of the ramp. The support for the tube is an L-shaped support connected directly to the receiver. Jordan avoids using the tailgate as a means for support or a means of attachment.

SUMMARY OF THE INVENTION

The loading apparatus of the present invention incorporates a clamping plate for coupling a support structure to a pickup truck. The coupling is comprised of a movable jaw, the clamping plate, and the fixed jaw uses a ramp support bar. The ramp support bar is coupled to a hitch receiver ("receiver") used for towing trailers, boats and the like. The top side of the support structure has attached thereto a foldable loading ramp. When the loading ramp is extended or deployed the loading ramp serves as an inclined surface for loading riding mowers, small tractors, recreation vehicles, heavy appliances on hand trucks, and other items.

The main object of the present invention is to provide a loading apparatus specifically designed for pickup trucks that is securely attached and strong enough to support a variety of items that may be loaded. Another part of the main objective was to provide a loading apparatus that would not require modifications to the frame, body, or any part of the pickup truck.

Another object of the present invention is to provide a loading apparatus that is easy to install and remove. The inventors believe that a loading apparatus that is easy to install and remove is consistent with the variety of uses for pickup trucks.

It is an additional object of the present invention to adaptively fit pickup trucks from a variety of truck manufacturers. Although the variation in pickup truck dimensions is not extreme, the ability to change some of the dimensions of the loading apparatus allows manufacturers to pass the beneficial economies of scale to the consumer.

Yet another object of the invention is to have a loading ramp that is easy to deploy or extend. Existing ramps may require two persons to place the ramp into service.

Still another objective is to provide an extension of the truck bed.

BRIEF DESCRIPTION OF THE DRAWINGS

The above and other objects, features, and advantages of the present invention will become apparent from a consideration of the detailed description and the accompanying drawings.

DESCRIPTION OF THE PREFERRED EMBODIMENT

Figure 1:
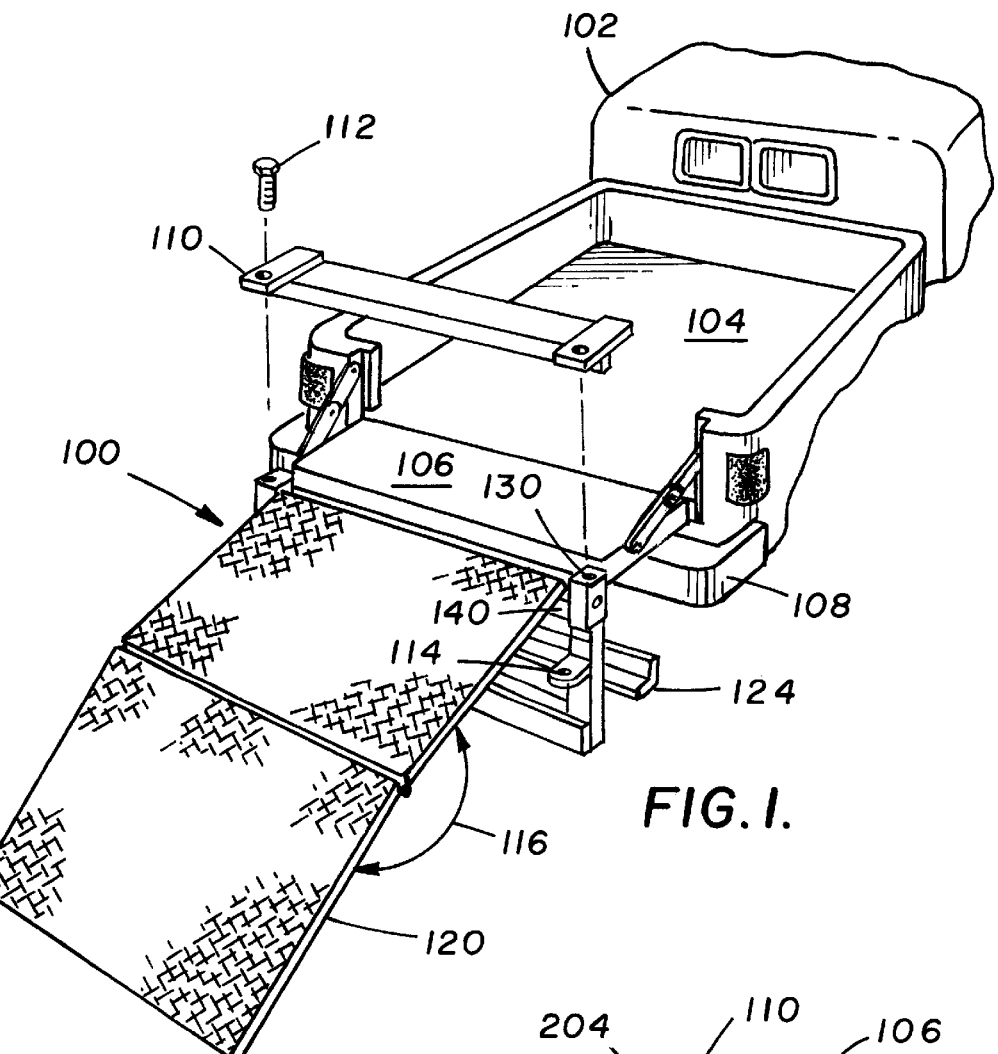
FIG. 1 illustrates an attachment means for coupling a ramp to a pickup truck in accordance with the present invention.

Referring now to FIG. 1 there is shown a pickup truck 102 having a truck bed 104, a opened tailgate 106, and a rear bumper 108. The pickup truck is shown with an embodiment of the loading apparatus 100 of the present invention installed with an inclined loading surface available for use. A clamping plate 110 is shown in an unattached position to illustrate part of the means for attaching support structure 124 securely to the pickup truck. When the clamping plate is attached to the support structure by use of two assembly screws 112 (only one is shown), the clamping plate serves as the top jaw of a clamp. A loading ramp 120 is shown in an extended position where the top end of the loading ramp is attached with a hinge (not shown) to a pivot support bar 140 on the support structure and the bottom end of the loading ramp is resting on the ground. The loading ramp of FIG. 1 has two sections joined with a hinge. The contact angle 116 between the first section and the second section, when viewed from the side is around 172 degrees. An eight degree departure from 180 degrees provides clearance advantages when loading and also prevents the loading ramp from sagging.

Figure 2:
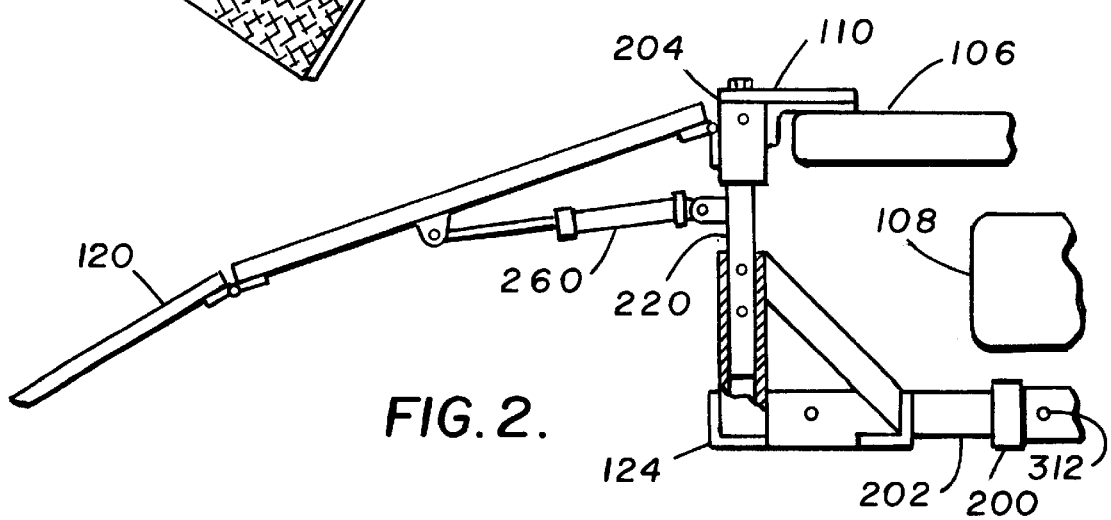
FIG. 2 is a side view of an attachment means of an embodiment of the present invention.

A side view of the loading apparatus 100 is shown in FIG. 2. A receiver 200, available as an optional part of the pickup truck, provides a coupling means for ramp support bar 202. The receiver typically is a steel tube having an inside dimension of two inches by two inches. The ramp support bar 202 of the present invention is a square bar having an outside dimensions suitable for insertion into the receiver. The ramp support bar 202 has a receiver end with receiver pin hole 312 and adjustable end with two or more holes. The receiver end is pinned to the receiver using a pin with a safety clip. In one embodiment the inventors have determined that five holes at a one inch spacing in the adjustable end provide for the variation in pickup truck dimensions. The support structure 124 has a bottom side 208 coupled to the adjustable end of the ramp support bar 202. The coupling of the bottom side of the support structure uses a channel shaped tube, having one hole, that slides horizontally on the ramp support bar. When the top side 204 of the support structure is horizontally positioned close to the opened tailgate 106 a pin secures the channel shaped tube to the ramp support bar 202. A pair of vertical adjustment bars 220 provide for vertical adjustment and place the top side of the support structure at a vertical level approximately equal to the top of the opened tailgate. After the vertical adjustment bars are positioned, bolts are used to hold the top side of the support structure in place. In summary the support structure can be moved horizontally and vertically to a desired position and then securely locked in place. After the support structure is in place, the clamping plate 110 and assembly screws 112 are installed, thereby forming a clamp to secure the support structure to the pickup truck. The vertical and horizontal positioning methods as described are not limitations on the present invention. Those skilled in the art could use other known locking and adjustment elements to form the clamp serving as the attachment means of the present invention.

Still referring to FIG. 2, the support structure 124 is coupled to the pickup truck at the receiver 200 via the ramp support bar 202, and at the opened tailgate 106, via the clamping plate 110. The combination of the two couplings provides a means for load sharing not used by prior art loading ramps.

Figure 3:
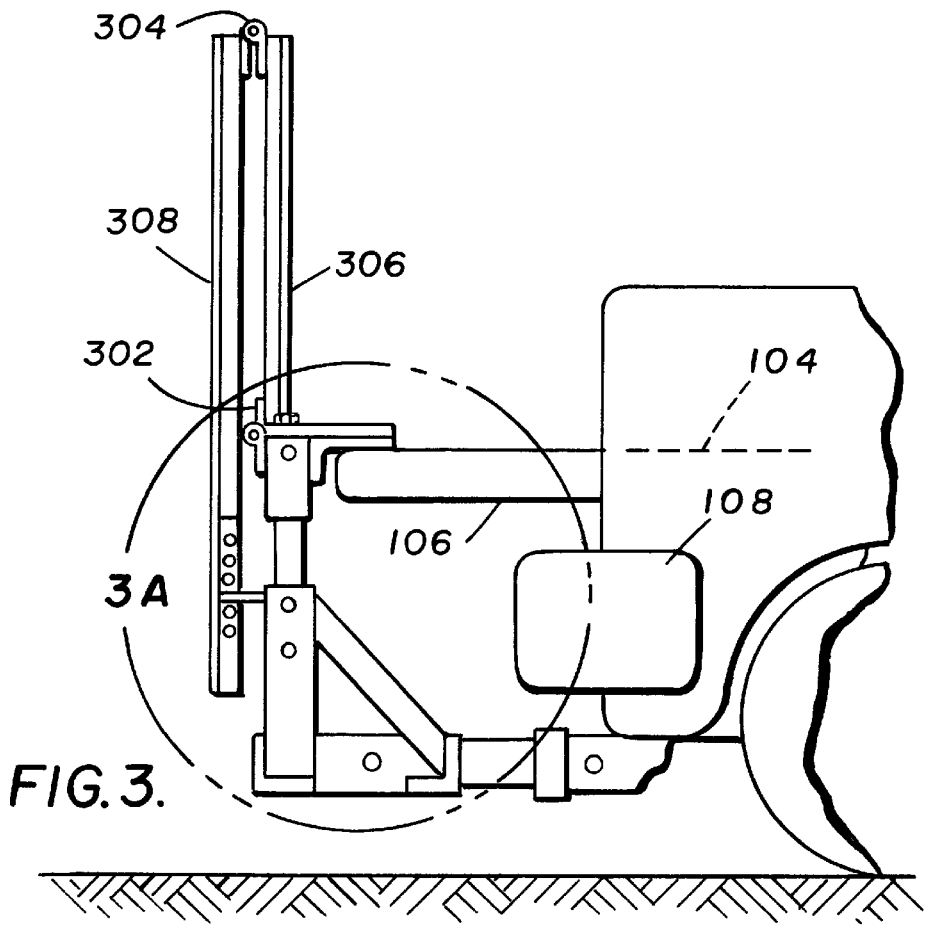
FIG. 3 illustrates a loading ramp in a retracted position in accordance with the present invention.
Figure 3A:
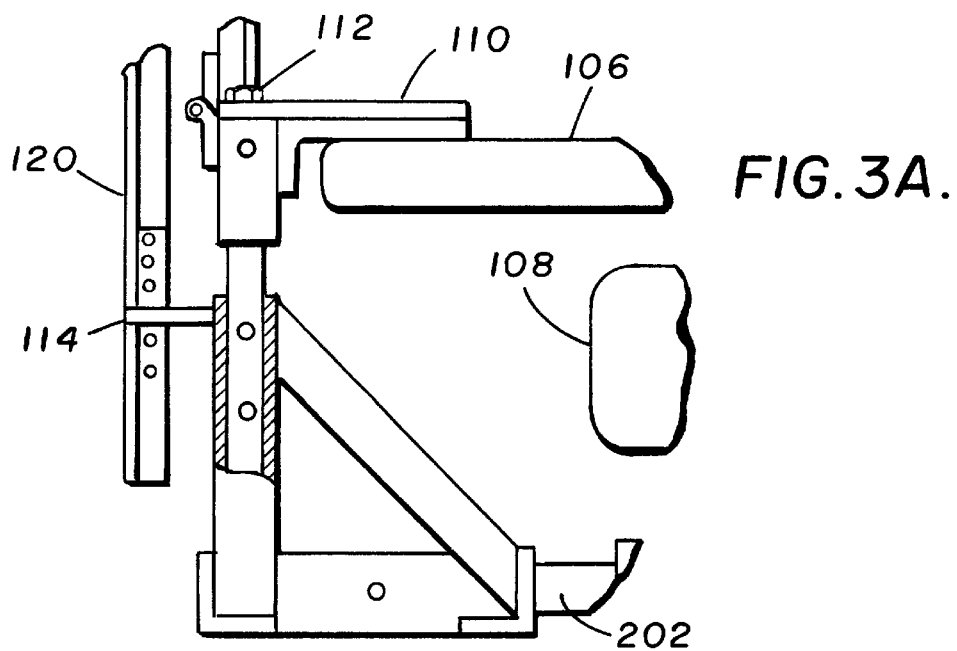
FIG. 3A illustrates the details of the loading ramp in the retracted position.

FIG. 3 shows the loading ramp 120 in a retracted position. The loading ramp in the shown embodiment has a first section 306 and a second section 308. The first section is attached on one end via a pivot bar hinge 302 to the pivot bar of the support structure and on the second end of the first section is attached to one end of the second section. The two sections are coupled together using a center hinge 304. The other end of the second section is designed to rest on the ground. In one embodiment, the end of the second section resting on the ground has wheels on each side allowing for easy movement toward and away from the pickup truck. The easy movement toward and away from the pickup is helpful when extending or retracting the loading ramp. Another means for assisting with extending or retracting the loading ramp uses an air spring 260, shown in FIG. 2 where the air spring is coupled on between the support structure and a point near the center of the first section. Modification to the two assisting means as described would fall within the scope of the present invention. When the loading ramp is in the retracted position, pins are inserted through tabs, one on each side, in the second section to the lock pin holes 114 on the ramp support structure.

Figure 4:
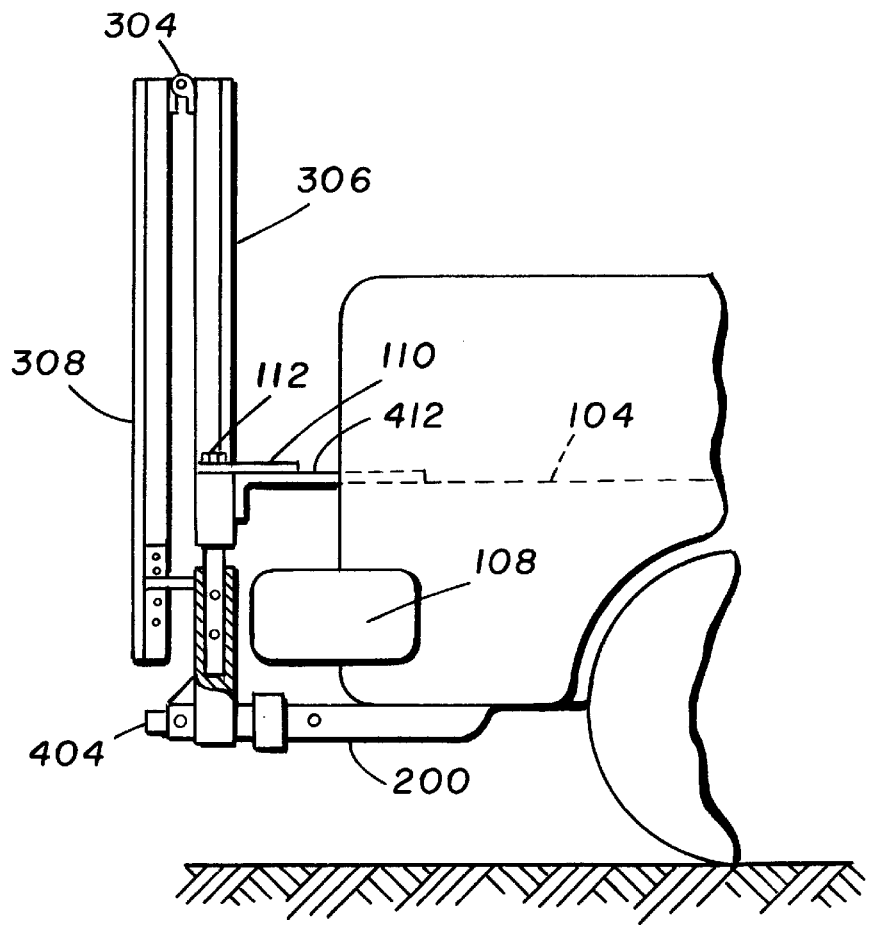
FIG. 4 illustrates a second attachment means of an embodiment of the present invention.

The loading apparatus as shown in FIG. 1 may be modified to attach to a pickup truck when the tailgate has been removed. An arrangement for coupling directly to the truck bed floor is shown in FIG. 4. In the embodiment of FIG. 4 the receiver accepts a modified ramp support bar 404. A modified support structure 408 is has a top side used as an surface for the clamping plate 110. The clamping plate is used with an extension plate 412 in order to have enough length to reach between the floor of the truck bed and the top side of the modified support structure. Adjustments for the horizontal and vertical positioning is done in a manner similar to the methods used for the loading apparatus of FIG. 2.

Figure 5:
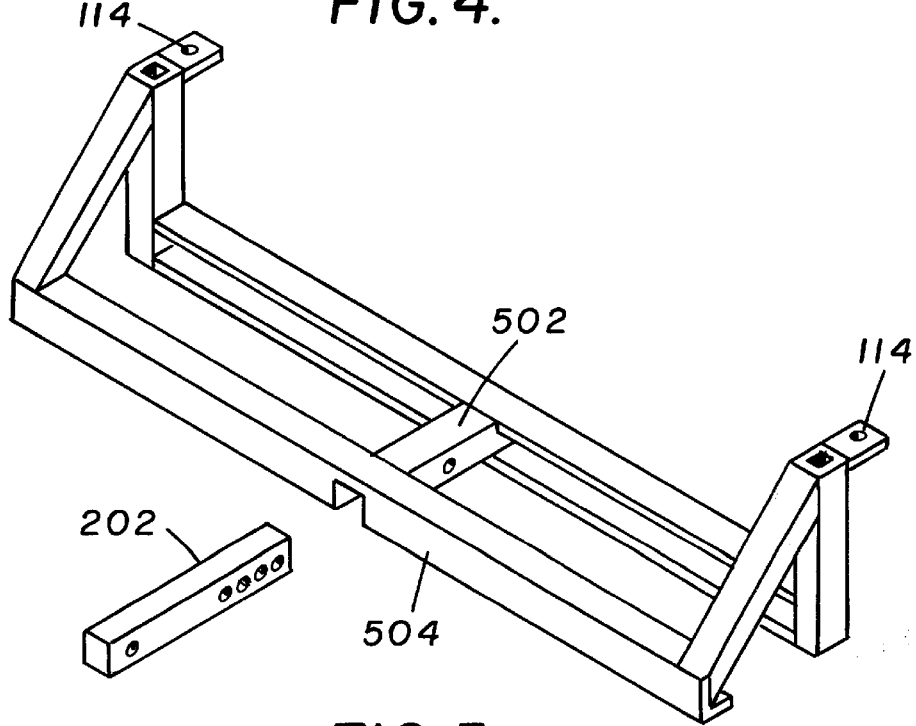
FIG. 5 illustrates details of a ramp support bar and a support structure for an embodiment of the present invention.

FIG. 5 illustrates in detail the ramp support bar 202 and support structure 124. The one hole on the receiver end of the ramp support bar is shown and the five holes are shown in the adjustable end of the ramp support bar. The support structure 124 is shown with the lock pin holes 114 and a support channel 502 for resting on the ramp support bar. The front side 504 of the support structure faces toward the rear bumper of the pickup truck.

Figure 6:
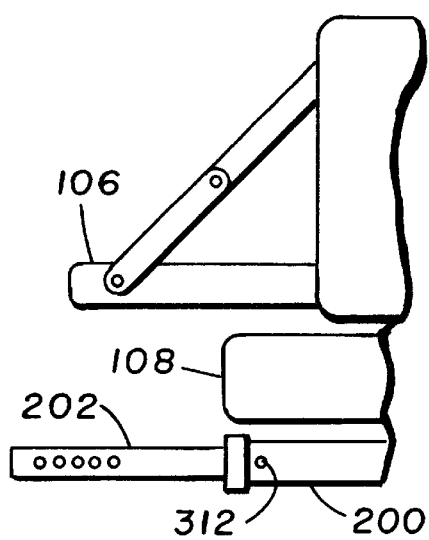
FIG. 6 illustrates a first step for the installation of an embodiment of the present invention.
Figure 7:
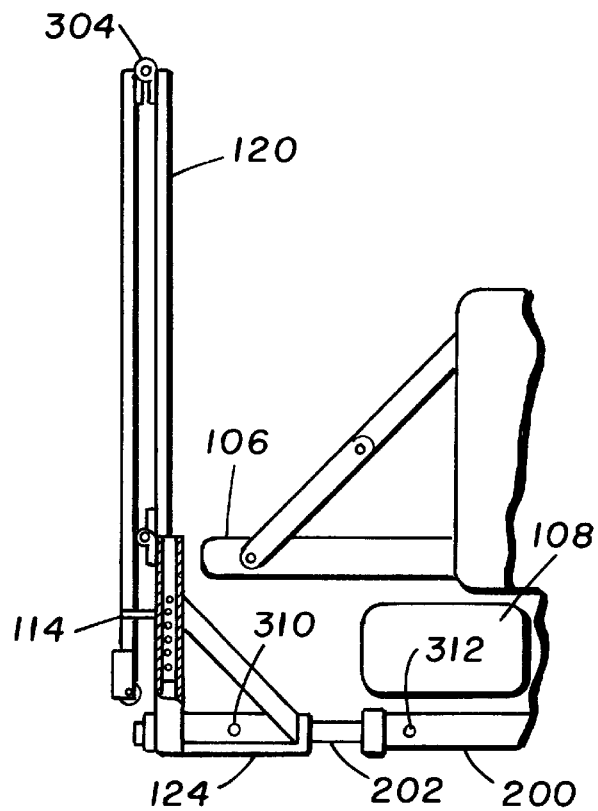
FIG. 7 illustrates a second step for the installation of an embodiment of the present invention.
Figure 8:
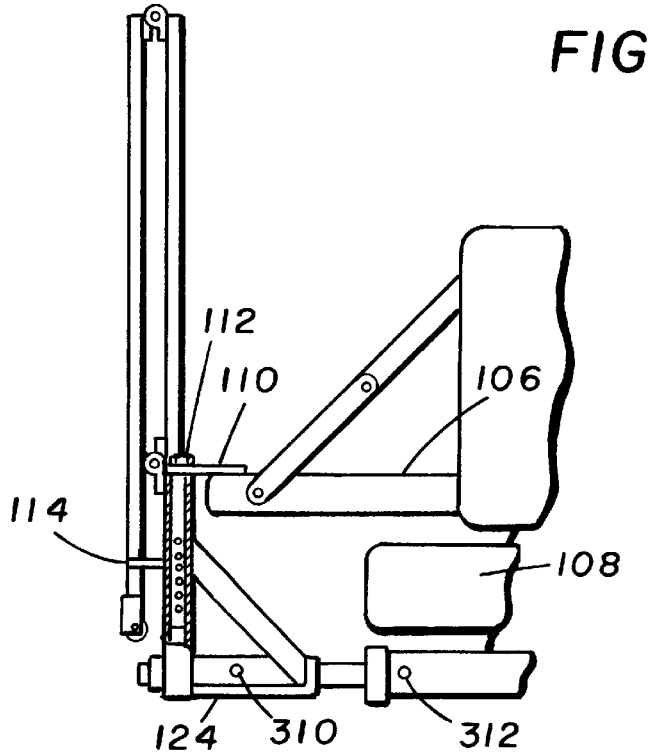
FIG. 8 illustrates a third and final step for installation of an embodiment of the present invention.

FIG. 6, FIG. 7, and FIG. 8 illustrate the steps for installing the loading apparatus 100 to a pickup truck having a receiver. The steps illustrate the ease of installation and assist with an understanding of the clamping arrangement of the present invention. The first step is to insert the ramp support bar 202 in the receiver resulting in the arrangement shown in FIG. 6. Next the support structure 124 and the loading ramp are placed on the ramp support bar. Because the bottom of the support bar has a channel that slides over the ramp support bar the horizontal position of the support structure is adjusted so the top of the support structure is close to the opened tailgate. A pin is then put through a channel hole 310 in the channel and though one of the five holes in the ramp support bar. Next a vertical adjustment is made so the top of the support structure is approximately level with the top of the opened tailgate. FIG. 7 illustrates the results of the above steps. Finally the clamping plate 110 is put in place and the assembly screws 112 are inserted and tightened. FIG. 8 illustrates the results of the installation steps. The loading apparatus is now in place and is usable for loading riding mowers, recreation vehicles and the like.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims. The invention is further defined by the following claims:

What is claimed is:

1. A loading apparatus for a pickup truck, the pickup truck having a receiver, a rear bumper and an opened tailgate with a top side, the loading apparatus comprising:

a ramp support bar coupled to the receiver, the ramp support bar oriented parallel with the top side of the tail gate and perpendicular to the rear bumper;

a support structure having a top side with a pivot bar where the top side of the support structure is essentially in a plane with the top side of the tailgate and a bottom side where the bottom side is coupled to the ramp support bar;

a clamping plate having a first edge resting on the top side of the support structure and a second edge resting on the top side of the tailgate, the clamping plate serving as an adjustable jaw of a clamp where the clamping plate is pulled towards and secured against the top side of the tailgate; and a loading ramp pivotally coupled to the pivot bar, the loading ramp when extended providing an inclined loading surface.

2. The loading apparatus of claim 1 wherein the ramp support bar has a receiver end coupled to the receiver and further has an adjustment end with a horizontal adjustment coupling means.

3. The loading apparatus of claim 2 wherein the support structure has a vertical adjustment means for positioning the top side of the support structure.

4. The loading apparatus of claim 3 wherein the loading ramp is comprised of two or more hinged sections where a first hinged section is coupled to the pivot bar.

5. The loading apparatus of claim 4 wherein the loading ramp has an assisting spring coupled between the first hinged section and a point on the support structure, thereby providing mechanical assistance when extending or retracting the loading ramp.

6. The loading apparatus of claim 5 wherein the loading ramp, when in the retracted position, is secured to the support structure.

7. A loading apparatus for a pickup truck, the truck having a receiver, a rear bumper and a cargo bed floor, the loading apparatus comprising:

a ramp support bar coupled to the receiver, the ramp support bar oriented parallel with the cargo bed floor and perpendicular to the rear bumper;

a support structure having a top side and a bottom side where the bottom side is coupled to the ramp support bar;

a clamping plate having a first edge adjustably coupled to the top side of the support structure and a second edge resting on the cargo bed floor, the clamping plate serving as an adjustable jaw of a clamp and the ramp support bar serving as the fixed jaw of the clamp; and a loading ramp pivotally coupled to the top side of the support structure, the loading ramp providing an inclined loading surface.

8. The loading apparatus of claim 7 wherein the support structure has a vertical adjustment means for positioning the top side of the support structure at essentially the same level as the surface of the cargo bed floor.

9. The loading apparatus of claim 8 wherein the loading ramp is comprised of two or more hinged sections where a first hinged section is coupled to the top side of the support structure.

10. A method for providing a loading apparatus to a pickup truck, the truck having a receiver and an opened tailgate with a top side the method comprising the steps of:

coupling a ramp support bar to the receiver;

attaching a support structure with a top side to the ramp support bar;

adjusting the top side of the support structure essentially in a plane with the top side of the opened tailgate;

placing a first edge of a clamping plate on the top side of the tailgate where a second edge of the clamping plate is attached to the top side of the support structure;

forcing the clamping plate towards and against the top side of the tailgate;

securing the clamping plate against the top side of the tailgate; and extending a loading ramp from the support structure.

11. The method of claim 10 wherein the coupling step comprises;

inserting a receiver end of the ramp support bar into the receiver; and pinning the first end to the receiver.

12. The method of claim 11 wherein the attaching step comprises;

placing the support structure at a predetermined distance from the tailgate; and pinning the support structure to an adjustment end of the support bar.

13. A loading apparatus for a pickup truck, the truck having a receiver and an opened tailgate the loading apparatus comprising:

a means for clamping a support structure between the receiver and the opened tailgate where the clamping means includes a flat plate with a bottom side resting on the opened tailgate, the bottom side further resting on and attached to the support structure, the bottom side of the flat plate serving as a contact surface for an adjustable jaw of a clamp and where a fixed jaw of the clamp includes a ramp support bar coupled to the receiver and the support structure; and a loading ramp coupled to the support structure, the loading ramp having a deployed position for providing an incline loading surface, the loading ramp further having a retracted position for storing the loading ramp.

14. A loading apparatus for a pickup truck, the truck having a receiver and a cargo bed the loading ramp comprising:

a means for clamping a support structure between the receiver and the cargo bed where the clamping means includes a flat plate resting on the cargo bed, the flat plate being attached to the support structure, the flat plate serving as an adjustable jaw of a clamp; and a loading ramp coupled to the support structure, the loading ramp having an extended position for providing an incline loading surface, the loading ramp further having a retracted position for storing the loading ramp.

* * * * *